US 9,203,615 B2

(12) United States Patent
Papillon et al.

(10) Patent No.: US 9,203,615 B2
(45) Date of Patent: Dec. 1, 2015

(54) CONFIDENTIAL PROVISIONING OF SECRET KEYS OVER THE AIR

(71) Applicant: Alcatel Lucent, Paris (FR)

(72) Inventors: Serge Papillon, Nozay (FR); Haithem El Abed, Nozay (FR); Antony Martin, Nozay (FR); Abdullatif Shikfa, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 107 days.

(21) Appl. No.: 14/027,438

(22) Filed: Sep. 16, 2013

(65) Prior Publication Data

US 2014/0089669 A1   Mar. 27, 2014

(30) Foreign Application Priority Data

Sep. 25, 2012 (EP) .................................... 12306159

(51) Int. Cl.
*H04L 9/08* (2006.01)
*H04W 4/00* (2009.01)
*H04W 12/04* (2009.01)
*H04W 8/20* (2009.01)

(52) U.S. Cl.
CPC ............ *H04L 9/0838* (2013.01); *H04L 9/0844* (2013.01); *H04L 9/0891* (2013.01); *H04W 4/003* (2013.01); *H04W 12/04* (2013.01); *H04W 4/005* (2013.01); *H04W 8/205* (2013.01)

(58) Field of Classification Search
None
See application file for complete search history.

(56) References Cited

U.S. PATENT DOCUMENTS 8,621,201 B2 * 12/2013 Costa et al. .................... 713/155
2003/0177392 A1 * 9/2003 Hiltgen .......................... 713/201
(Continued)

FOREIGN PATENT DOCUMENTS

EP        2448298       5/2012
WO     2011115407       9/2011

OTHER PUBLICATIONS

3GPP Standard; 3rd Generation Partnership Project; Technical Specification Group Services and System Aspects; Feasibility Study on the Security Aspects of Remote Provisioning and Change of Subscription for Machine to Machine (M2M) Equipment (Release 9); 3GPP Standard; 3GPP TR 33.812; 3rd Generation Partnership Project (3GPP); Mobile Competence Centre; 650, Route Des Lucioles; F-06921 Sophia-Antipolis Cedex; France; No. V.9.2.0, Jun. 22, 2010; pp. 1-87; XP050441986; [Retrieved on Jun. 22, 2010].

*Primary Examiner* — David Le
(74) *Attorney, Agent, or Firm* — Patti & Malvone Law Group, LLC

(57) ABSTRACT

A method and apparatus for personalizing a smart card coupled with a communication device of a user who is a subscriber of a first telecommunication network and wishes to become a subscriber of a second telecommunication network is disclosed. A first authentication key is stored in both the smart card and in an first application server included in the first telecommunication network. A secure session is established with a second application server included in the second telecommunication network via the first telecommunication network by negotiating with the first application server and the second application server in order that the smart card and the second application server agree on an second authentication key. Shared values and shared functions according to a secure multiparty computation protocol are used to compute a second authentication key which replaces the first authentication key in the smart card.

17 Claims, 2 Drawing Sheets

(56) References Cited

U.S. PATENT DOCUMENTS

| | | | |
|---|---|---|---|
| 2006/0089124 A1* | 4/2006 | Frank et al. | 455/411 |
| 2009/0100264 A1* | 4/2009 | Futa et al. | 713/170 |
| 2009/0191857 A1 | 7/2009 | Horn et al. | |
| 2010/0106967 A1 | 4/2010 | Johansson et al. | |

* cited by examiner

CONFIDENTIAL PROVISIONING OF SECRET KEYS OVER THE AIR

CROSS REFERENCE

This application claims the benefit of European patent application No. EP 12306159.0, filed Sep. 25, 2012, the respective contents of which are hereby incorporated by reference in their entirety.

FIELD OF THE INVENTION

The present invention relates to a confidential provisioning of secret keys over the air.

BACKGROUND

Mobile communications provides access by mobile phones, Personal Digital Assistant PDAs, portable computers and a variety of other user equipment to communicate via radio access networks (RANs) to core networks for connection to other mobile devices, the Internet, and conventional land-line phones. The RANs are distributed over a geographical area typically divided into cells that are served by a corresponding base station. Base stations communicate over an air interface with the user equipment, with several base stations being connected to a radio network controller (RNC) or base station controller (BSC) that is connected to one or more core networks. In the typical situation, secure communications for users of the system may be provided through encryption and decryption at the base station. Communications between the core network and the base station is encrypted and communications between the base station and the wireless user equipment is also encrypted.

Mobile Networks are using a strong authentication method based on a shared secret configured on the network side in the Authentication Center of the HLR or the HSS, and on the terminal side in the Universal Integrated Circuit Card (UICC) containing a SIM (Subscriber Identity Module) application for a GSM network or a USIM (Universal Subscriber Identity Module) in a UMTS network.

This shared secret is an authentication key and the action to configure a generic UICC card with a given authentication key is called personalization.

The authentication key is a 128 bit key used in the authentication and cipher key generation process. The authentication key is used to authenticate the UICC card on the mobile network. Each UICC contains this authentication key which is assigned to it by the operator during the personalization process.

So Mobile Network Operators (MNOs) are physically personalizing the UICC cards in their premises and once for all. Operators then send the personalized UICC card to the user, who will insert it in his mobile terminal to access the mobile network of the MNO. The personalization can also be outsourced to the UICC provider, but it is always configured physically and for ever.

When a user wants to change its MNO, the new MNO sends a new personalized UICC card and the user has to insert this new card into its mobile terminal to access the new network. This implies a problem for devices that should be sold with the UICC inside them (for e.g. security reasons), or devices that are difficult (or too costly) to access, like sensors, cars/trucks, vending machines . . . . For these devices, the manual replacement of the UICC card is too costly or even impossible.

Furthermore, given both new connected objects (eg. cars, smart meters, . . . ) and new strong mobile manufacturers actors, there is a move from the industry to have the UICC card welded inside the connected object, put once for all inside the object at the manufacturing stage and for the whole object's life (eg. the end-user that has the object will not be able to physically remove the UICC card to put another one).

There is need to allow easy reconfiguration of the UICC of the mobile terminal with a different set of credentials, in order to change the serving mobile network operator. There is also a need to allow the end user to change freely of telecommunication operator while maintaining the strength and level of trust put into the secrets stored inside the USSIM of a given object via a secured provisioning protocol.

SUMMARY

To remedy the problems referred to hereinabove, there is provided a method for personalizing a smart card coupled with a communication device of a user being a subscriber of a first telecommunication network and wishing to become a subscriber of a second telecommunication network, a first authentication key being stored in the smart card and in an first application server included in the first telecommunication network, the method comprising the following steps in the smart card:

establishing a secure session with a second application server included in the second telecommunication network via the first telecommunication network, negotiating with the first application server and the second application server in order that the smart card and the second application server agree on an second authentication key, by exchanging messages referring to shared values and shared functions by means of a secure multiparty computation protocol involving the smart card, the first application server and the second application server, and computing the second authentication key depending on at least a shared value and a shared function, replacing the first authentication key by the second authentication key.

The invention advantageously allows a remote reconfiguration of credentials associated with a telecommunication network operator and allows ability to easily change of the subscription of telecommunication network operator in a very flexible way, in a non-limited number of times.

The invention advantageously enables new roaming offers which will benefit to the subscriber, since it will leverage on a local subscription without having to change its smart cards and allows embedment of smart cards into communication devices.

Furthermore, persistent shared secrets used for the smart-card authentication are not sent over the air but only a seed is used for the computation of the shared secrets.

The invention advantageously allows the provisioning of new secrets in both the smartcard side and the operator side when the user decides to move from one said old operator to one said new operator without the old operator sending the secret to the new operator, without the new operator revealing the new shared secret to the old operator and without sending the new secret over the air.

Advantageously, the second application server cannot deduce the value of the first authentication key, and first application server cannot deduce the value of the second authentication key, and the values of the first and second authentication keys are never transmitted over a communication channel.

In an embodiment, the smart card replaces the first authentication key by the second authentication key after that the second application server has authenticated the smart card by means of a challenge-response authentication using the second authentication key.

In an embodiment, the second authentication key depends on the first authentication key.

In an embodiment, the step of negotiating with the first application server and the second application server comprises the following steps:

negotiating with the second application server to agree on a random secret, negotiating with the first application server to agree on a first function, negotiating with the second application server to agree on a second function, after the first application server having sent a message to the second application server, the message comprising the value of the result of the first function applied to the first authentication key, computing the second authentication key depending on the value of the result of the second function applied to the random secret and to the value of the result of the first function applied to the first authentication key.

In an embodiment, the step of negotiating with the first application server and the second application server comprises the following steps:

negotiating with the second application server to agree on a random secret, after the first application server having sent a message to the second application server, the message comprising the value of the result of a first function applied to the first authentication key, computing the second authentication key depending on the value of the result of a second function applied to the random secret and to the value of the result of the first function applied to the first authentication key.

wherein the first function is part of a public method beforehand known from the smart card and the first application server, and the second function is part of a public method beforehand known from the smart card and the second application server In an embodiment, the first function is a cryptographic hash function which output space is the same as the space of the first authentication key.

In an embodiment, the second function is a combination mixing function which takes one input from the space of the first authentication key and another input from the space of the random secret.

In an embodiment, the smart card interrogates the second application server in order to validate the second authentication key, the second application server authenticating the smart card by means of the second authentication key.

In an embodiment, the smart card receives a message comprising a personalization command and an admin code sent from a manufacturer server triggered by the second application server, and interprets the personalization command to delete the first authentication key and replace it by the second authentication key if the admin code is valid.

In an embodiment, an application in the smart card checks if the admin code received in said message is compatible with an admin code initially stored in the smart card in order to determine if the received admin code is valid.

In an embodiment, the messages exchanged during the step of negotiating are short messages.

In an embodiment, the messages exchanged during the step of negotiating contain data packets and are sent through a service node and a gateway node of the first telecommunication network.

A further object of the invention is a smart card coupled with a communication device of a user being a subscriber of a first telecommunication network and wishing to become a subscriber of a second telecommunication network, a first authentication key being stored in the smart card and in a first application server included in the first telecommunication network, the smart card comprising:

means for establishing a secure session with a second application server included in the second telecommunication network via the first telecommunication network, means for negotiating with the first application server and the second application server in order that the smart card and the second application server agree on an second authentication key, by exchanging messages referring to shared values and shared functions by means of a secure multiparty computation protocol involving the smart card, the first application server and the second application server, and computing the second authentication key depending on at least a shared value and a shared function, means for replacing the first authentication key by the second authentication key.

A further object of the invention is an application server for personalizing a smart card coupled with a communication device of a user being a subscriber of a first telecommunication network and wishing to become a subscriber of a second telecommunication network, a first authentication key being stored in the smart card and in another application server included in the first telecommunication network, the application server being included in the second telecommunication network and comprising:

means for establishing a secure session with the smart card via the first telecommunication network, means for negotiating with the smart card and said another application server in order that the smart card and the application server agree on an second authentication key, by exchanging messages referring to shared values and shared functions by means of a secure multiparty computation protocol involving the smart card, said another application server and the application server, and computing the second authentication key depending on at least a shared value and a shared function.

The invention relates further to computer program adapted to be executed in a server for performing a personalization of a smart card coupled with a communication device, said program including instructions which, when the program is executed in said server, execute the steps of the method of the invention.

BRIEF DESCRIPTION OF THE FIGURES

Some embodiments of the present invention are now described, by way of example only, and with reference to the accompanying drawings, in which.

The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
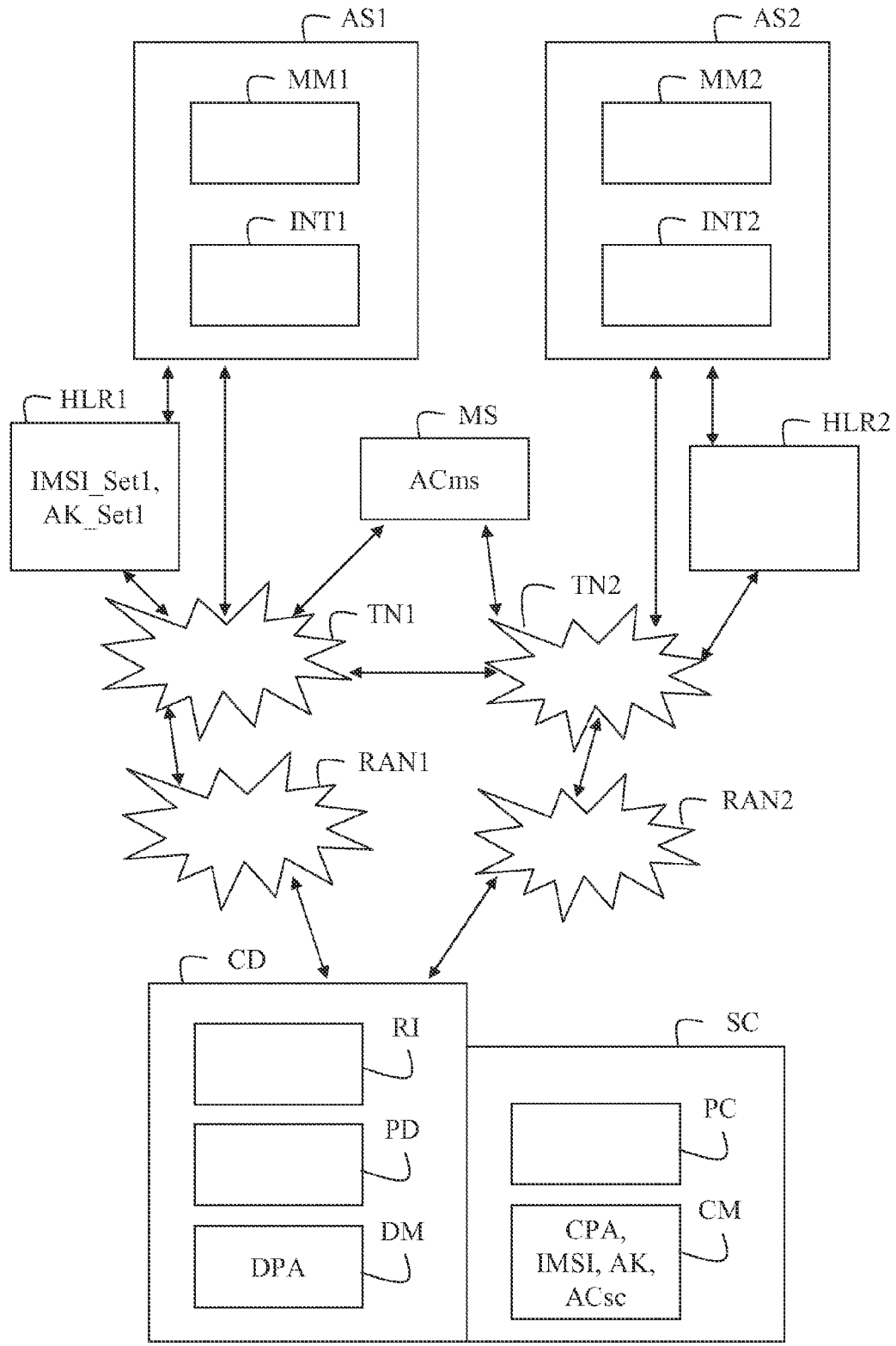
FIG. 1 is a schematic block-diagram of a communication system according to an embodiment of the invention.

Referring to FIG. 1, a communication system comprises a communication device CD, a first application server AS1 of a first telecommunication network TN1 and a second application server AS2 of a second telecommunication network TN1 which are able to communicate between them through the first telecommunication network TN1 and the second telecommunication network TN2.

For example, the telecommunication network TN1, TN2 is a digital cellular radio communication network of the GSM (Global System for Mobile communications) or UMTS (Universal Mobile Telecommunications System) or even CDMA (Code Division Multiple Access) type or even LTE (Long Term Evolution) type. The GSM type network may be coupled with a GPRS (General Packet Radio Service) network for the transmission of data by packets with mobility and access management via radio. For example, the telecommunication network is able to authorize a communication device to send and receive data via the network when the communication device is identified at the network, for example by means of a subscriber identification module associated with the communication device.

FIG. 1 does not represent known main components of the localization area of the telecommunication network where the communication device is situated. For example in a GSM type network, the localization area comprises an MSC (Mobile service Switching Center) which is connected by means of a BSC (Base Station Controller) to a base station BTS (Base Transceiver Station) connected by means of a radio link to the communication device.

The communication device CD can establish a connection with the telecommunication network TN1, TN2 through a respective radio access network RAN1, RAN2 via a radio link with the base station. The radio access networks are distributed over a geographical area typically divided into cells that are served by a corresponding base station. Base stations communicate over an air interface with the user equipment, with several base stations being connected to a radio network controller (RNC) or base station controller (BSC) that is connected to one or more core networks. In the typical situation, secure communications for users of the system may be provided through encryption and decryption at the base station.

Each telecommunication network TN1, TN2 comprises a respective Home Location Register HLR1, HLR2 and one or more Visitor Location Register connected to a switch MSC and/or to a service node SGSN (Serving GPRS Support Node). Each register HLR1, HLR2 collaborates with an authentication center that manages a respective database containing, in particular, a set of international identities IMSI (International Mobile Subscriber Identity) and a set of authentication keys called AK each associated with a subscription profile for each user of the network and the number of the visitor location register to which the communication device is temporarily connected.

The radio access network of each telecommunication network is connected to a service node SGSN and a gateway-node GGSN (Gateway GPRS Support Node) supporting a packet-switched core network of the telecommunication network and is connected to a switch MSC supporting a circuit-switched core network of the telecommunication network. All of the SGSN and GGSN nodes constitute a gateway connecting the radio access network and the packet core network. According to the invention, the application server AS1, AS2, may be directly or indirectly accessible from the gateway node GGSN of the corresponding telecommunication network via a packet communication network, for example the Internet, and also from the switch MSC via a Short Message Service Center SMSC.

In order to not encumber the FIG. 1, the mentioned service node SGSN, gateway-node GGSN and Short Message Service Center SMSC of each telecommunication network are not represented.

The communication device CD can be a radio communication mobile terminal. For example, the communication device CD is a mobile phone, or is a communicating Personal Digital Assistant PDA, or an intelligent telephone like SmartPhone.

In an example, the communication device CD is a cellular mobile radio communication terminal, connected by a channel to a radio access network of the telecommunication network TN, e.g. GSM (Global System for Mobile communications) or UMTS (Universal Mobile Telecommunications System) or LTE (Long Term Evolution).

By way of example, the communication device CD may be a motor vehicle belonging to a taxi company, or an automatic counter of a particular energy, such as water, gas, or electricity belonging to a company in the energy sector, or a beverage vending machine belonging to a company specializing in food vending. The communication device CD is therefore a fixed or mobile device that contains a UICC card and can communicate with the telecommunication network by means of the UICC card.

In other examples, the communication device CD can be replaced by any device which is equipped with a smart card reader and can communicate with the smart card.

In one embodiment, it is considered that the communication device CD is owned by a user who is a subscriber of the first telecommunication network TN1 and who wishes to become a subscriber of the second telecommunication network TN2, cancelling thus its subscription to the first telecommunication network.

In all cases, it is considered that the communication device and the smart card are owned by a user. For example, the user can be a physical person or an individual in case the communication device is a mobile terminal or a SmartPhone, and the user can be a moral person or a legal entity in case the communication device is a machine like a motor vehicle or an automatic counter.

The communication device CD is associated with a smart card SC, for example included in the communication device CD.

The communication device CD comprises a radio interface RI, a processor PD, device memories DM and a smart card reader. The memories DM comprise various memories such as ROM memory, nonvolatile memory EEPROM or Flash, and RAM memory.

The radio interface RI transposes in frequency, converts digitally, demodulates and decodes messages received via the telecommunication network TN, and inversely transmits messages.

The device memories DM comprise the operating system of the communication device CD and an execution environment such as a Java virtual machine JVMT programmed in Java, for example J2ME.

In particular, in the nonvolatile memory of device memories DM are implemented device applications, originally written in a high level language of type object-oriented such as language Java compatible with virtual machine JVMT. The virtual machine JVMT can communicate with a virtual machine JVMC installed in the smart card SC via a predetermined communication protocol, like protocol APDU.

In order that device applications respectively communicate with card applications implemented in the smart card SC in accordance with predetermined communication protocol, an access interface to access resources and data in the smart card is implemented in the device memories DM for example under the form of a Java API (Application Programming Interface).

Device memories DM further include a communication interface, for example the SIM Toolkit engine, so that a main application SIM or USIM or any other application in the smart card communicates with the "outside world" via the communication device, for example with an application server. The communication interface manages commands and responses exchanged between the "outside world" and the main application SIM or USIM, for example by adapting them to short messages exchanged with a short message server.

The smart card SC, also known as microcontroller card or integrated circuit card, is a user identity module of UICC type associated with the communication device.

In one embodiment, a microcontroller in the smart card SC mainly comprises one or more processors PC, and card memories CM. The smart card exchange commands, or requests, and replies with the communication device CD via an input/output port of the smart card reader of the communication device CD with or without contact. The various components of the smart card may be interconnected by a bidirectional bus.

Card memories CM comprise memory of type Flash or ROM including codes and data for example of an operating system and a virtual machine JVMC compliant with the Java Card specification, or any other operating system.

Card memories CM comprise also memory of type Flash or EEPROM for storing for example identity numbers and other parameters of the profile of the user possessing the card, such as a PIN code, an international identity, an authentication key, an admin code, and other security data. It is considered that the communication device CD is owned by a user who is a subscriber of the first telecommunication network TN1, so card memories CM contains an admin code ACsc for accessing the smart card stored in correspondence with an international identity IMSI_1 and with an authentication key AK_1, used to authenticate the user by the first telecommunication network TN1.

Card memories CM comprise also memory of type RAM serving more particularly to data processing.

Card memories CM comprise also a memory space to store card applications which are proprietary code or applets STK, e.g. SIM ToolKit, and that are installed during the manufacture of the smart card or possibly installed during use of the card at the request of the user or the operator.

In particular, a card personalization application CPA is stored in the card memories CM and has a read/write access especially to the international identity and the authentication key, for example under an OTA command presenting the admin code ACsc. The card personalization application CPA is able to handle commands and messages according to an over-the-air (OTA) mechanism and is able to communicate with a corresponding device personalization application DPA stored in the device memories DM of the communication device CD for some functionalities such as an interface with the user, and is also able to communicate with the application server AS for the personalization of the smart card.

Each telecommunication network TN1, TN2, comprises a respective application server AS1, AS2. The application server is a platform that is accessible from the communication device CD through the corresponding telecommunication network.

Each application server AS1, AS2, is able to communicate with the corresponding register HLR1, HLR2 directly and the application servers AS1 and AS2 are able to communicate between them through the first and the second telecommunication networks TN1 and TN2, via a secured session for example of IPsec (Internet Protocol Security) type or SS7 (Signaling System #7) type.

Each application server AS1, AS2, comprises a respective messaging module MM1, MM2, handling exchange of messages with the communication device CD and the smart card SC, for example in the form of short message through a short message center, and handling exchange of messages with entities of the first and the second telecommunication networks TN1 and TN2.

Each application server AS1, AS2, comprises a respective interface INT1, INT2, for communicating with the respective register HLR1, HLR2. Each register HLR1, HLR2, manages a respective set of admin codes. It is considered that an admin code allows a command provided through an OTA mechanism to obtain read/write access to the space memory of a smart card where the international identity IMSI and the authentication key AK are stored.

The communication system comprises optionally a manufacturer server MS, connected at least to the second telecommunication network TN2. The manufacturer server MS manages a set of admin codes, allowing read/write access to the space memory of a smart card.

Figure 2:
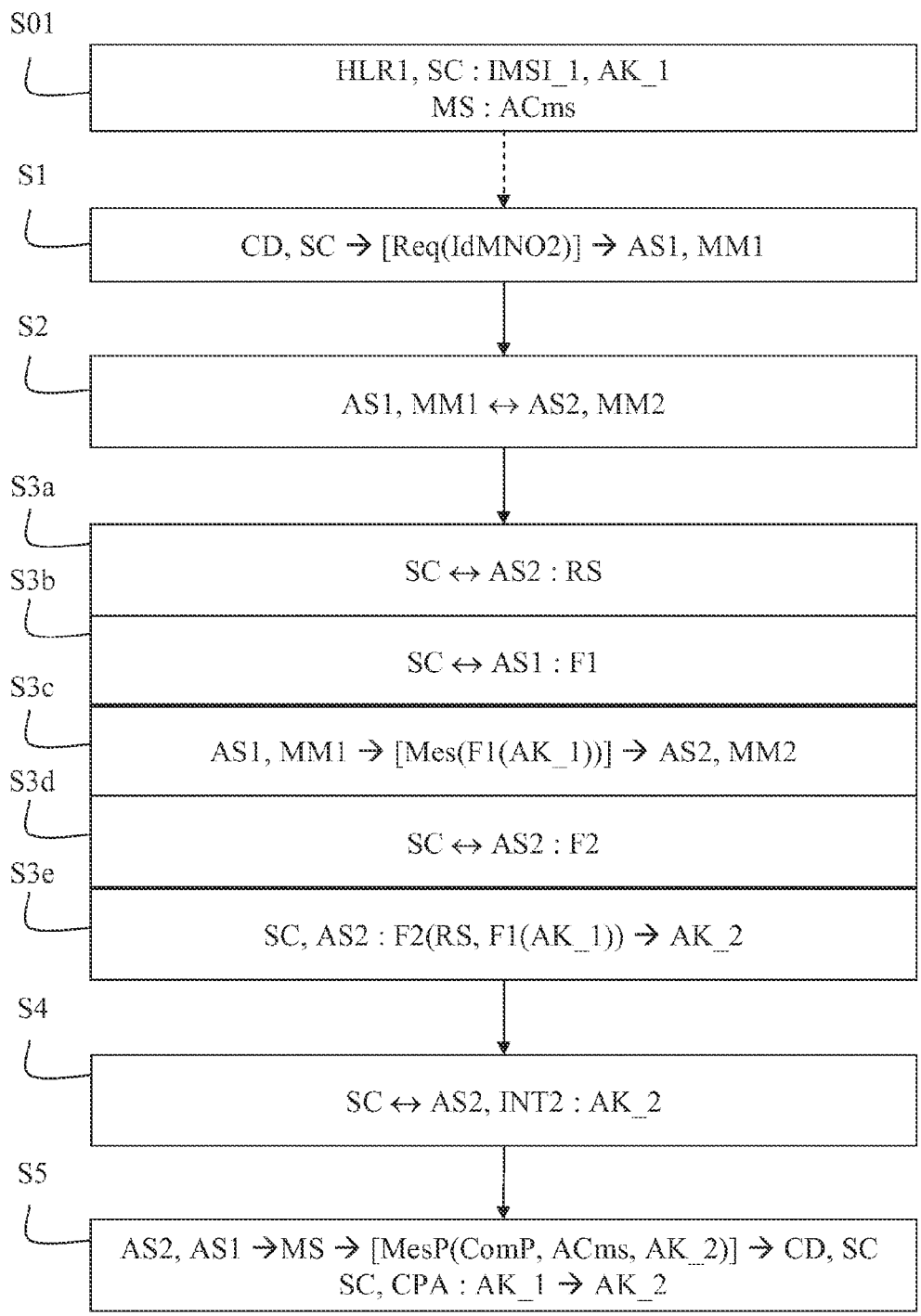
FIG. 2 is a flowchart showing steps performed to execute a method for a confidential provisioning of secret keys over the air in a telecommunication network according to an embodiment of the invention.

With reference to FIG. 2, a method for a confidential provisioning of secret keys over the air for a smart card coupled with a communication device according to one embodiment of the invention comprises steps S1 to S6 executed automatically within the communication system.

The method is described hereinafter with reference to the first and the second telecommunication networks TN1 and TN2 for a user who is a subscriber of the first telecommunication network TN1 and who wishes to become a subscriber of the second telecommunication network TN2, but can be extended to more telecommunication networks.

At an initial step S01, the first and the second telecommunication networks TN1 and TN2 make agreement for potential subscription change of users.

Once a smart card is provided to the operator and attributed to a user who becomes a subscriber of the operator, the operator personalizes the smart card by creating an international identity and an authentication key. The personalization of the smart card could be also outsourced to the smart card manufacturer. The created international identity and authentication key are stored in the register HLR in correspondence with an admin code for accessing the smart card.

In the example embodiment, a user becomes a subscriber of the first telecommunication network TN1. The database of register HLR1 contains a first international identity IMSI_1 and a first authentication key AK_1. Also, the manufacturer server MS stores an admin code ACms, optionally in correspondence with an identifier IdSC of the smart card. Also, the international identity IMSI_1 and the authentication key AK_1 are stored in the card memories CM of the smart card SC.

At step S1, the user solicits a request in order to change its operator subscription for the operator of the second telecommunication network TN2. For example, the user selects a command in a menu displayed in the communication device by a device personalization application DPA or enters a code of command read from a document of the operator.

The communication device CD sends a request Req comprising an identifier IdMNO2 of the second telecommunication network TN2 to the first application server AS1.

In one embodiment, the request Req is in the form of a short message which is handled by a short message center that transforms the message into data packets and sends the data packets through first the telecommunication network TN1 to the first application server AS1.

In a variant embodiment, the user does not transmit the request to the application server but the user contacts a customer center of the operator of the second telecommunication network TN2, for example via a contact center or a web site, and provides an identifier IdSC of the smart card to the operator. After user agreement, an entity of the operator sends a similar request Req to the application server AS, the request comprising an identifier IdMNO2 of the second telecommunication network TN2 and the identifier IdSC of the smart card.

The messaging module MM1 of the first application server AS1 receives the request and interprets it as a request of subscription change in favor of the operator of the second telecommunication network TN2 thanks to the received identifier IdMNO2.

The interface INT1 of the first application server AS1 retrieves in the database of the register HLR1 the international identity IMSI_1 and the authentication key AK_1, by means of credentials sent by the communication device CD in case the request Req is received from the communication device CD, or by means of the identifier IdSC of the smart card in case the request Req is received from an entity of the second telecommunication network TN2.

Optionally, the messaging module MM1 of the first application server AS1 sends a message to the communication device CD, containing an indication that subscription change request is accepted and will be processed.

At step S2, the messaging module MM1 of the first application server AS1 establishes a secured session, for example of IPsec type or SS7 type, with the messaging module MM2 of the second application server AS2 of the second telecommunication network TN2, identified by the identifier IdMNO2.

At step S3, the smart card SC, the first application server AS1 and the second application server AS2 negotiate in order that the smart card SC and the second application server AS2 agree on an second authentication key AK_2, by exchanging messages referring to shared values and shared functions, the term "referring" meaning that the message can contain or designate a value and/or a function shared between two parties.

The computation of the second authentication key AK_2 is performed thanks to a secure multiparty computation protocol involving the smart card SC, the first application server AS1 and the second application server AS2, wherein only the smart card SC and the second application server AS2 can compute the second authentication key AK_2.

Optionally, the second authentication key AK_2 depends on the first authentication key AK_1 in order to maintain the strong security relationship between the smartcard and its initial operator. However during the exchanges, parties should not learn any information about other parties inputs that they do not share, and in particular the second operator should not get access to the first authentication key AK_1 in clear.

The step S3 can be decomposed in substeps S3a to S3e.

At substep S3a, the smart card SC and the second application server AS2 negotiate to agree on a random secret RS and store this latter. This agreement can be performed through an El-Gamal key agreement protocol without requiring a secured communication channel between the smartcard SC and the second application server AS2.

At substep S3b, the smart card SC and the first application server AS1 negotiate to agree on a first function F1 which output space is the same as the space of authentication key, for example SHA-256 truncated to 128 bits, and store this latter. Alternatively this first function could be specified in the protocol instead of being agreed on, or the first function is part of a public method beforehand known from the smart card and the first application server. For instance, the first function is a cryptographic hash function.

Alternatively, substep S3b can be performed before substep S3a.

At substep S3c, the first application server AS1 sends a message to the second application server AS2, the message comprising the value VR1 of the result of the first function F1 applied to the first authentication key AK_1.

At substep S3d, the smart card SC and the second application server AS2 negotiate to agree on a second function F2 which takes one input from the space of the first authentication key AK_1 and another input from the space of the random secret RS, and produces one output in the same space (for example an xor operation), and store this latter. Alternatively this second function could be specified in the protocol rather than being agreed on, or the second function is part of a public method beforehand known from the smart card and the second application server. For instance, the second function is a combination mixing function.

Alternatively, substep S3d can be performed before substep S3c.

At substep S3e, the smart card SC and the second application server AS2 both can compute the value VR2 of result of the second function F2 applied to the random secret RS and to the value VR1, i.e. the value of the result of the first function F1 applied to the first authentication key AK_1.

The smart card SC and the second application server AS2 compute a second authentication key AK_2 as a function of the value VR2.

It will be understood the first application server AS1 can not compute VR2 because it does not know the random secret RS and at the same time the second application server AS2 did not learn the first authentication key, at least because of the resistance property of the first function F1.

In one embodiment for step S3, the messages are transformed by a short message center SMSC of the second telecommunication network TN2 into a short message that is encrypted. The messages are decrypted by the smart card and the content of the message is temporarily stored in the card memories CM of the smart card to be executed by the card personalization application CPA.

In another embodiment for step S3, the messages contain data packets and are transmitted through the SGSN and GGSN nodes via a secured session for example of IPsec (Internet Protocol Security) type.

It will be understood that the messages can be decomposed in several messages, especially in the case where the messages are in form of short messages.

At step S4, the smart card SC interrogates the second application server AS2 in order to validate the second authentication key AK_2. To this end, the interface INT2 of the second application server AS2 authenticates the smart card SC by means of the computed second authentication key AK_2, more especially by means of a challenge-response authentication using the second authentication key.

At step S5, the card personalization application CPA replaces the first authentication key AK_1 by the second authentication key AK_2.

In a first embodiment, the messaging module MM2 of the second application server AS2 triggers the manufacturer server MS that sends a personalization message MesP to the communication device CD. The personalization message MesP comprises a personalization command ComP and an admin code ACms. Alternatively, the second application server AS2 requests the first application server AS1 to trigger the manufacturer server MS for sending the personalization message MesP to the communication device CD.

The card personalization application CPA interprets the personalization command ComP to execute the personalization of the smart card SC. The card personalization application CPA checks if the admin code ACms is valid, that is to say if the admin code ACms received in the personalization message MesP is compatible with the admin code ACsc initially stored in the smart card. In one example, the admin code ACms received in the personalization message MesP has to be the same as the admin code ACsc initially stored in the smart card. More generally, the admin codes may be tools used for authentication and ciphering procedures, in particular in case the personalization message MesP is decomposed in many messages.

If the admin code ACms is valid, the card personalization application CPA deletes the authentication key AK_1 initially stored in the card memories CM of the smart card SC, and replace them by the computed second and authentication key AK_2.

In a second embodiment, card personalization application CPA replaces the first authentication key AK_1 by the second authentication key AK_2 without intervention of the manufacturer server MS.

Optionally, the card personalization application CPA can activate the device personalization application DPA in order to ask an acknowledgement of the user for the card personalization. For example, the device personalization application DPA displays a question like the following: "Are you sure to change MNO and to become subscriber of MNO2?".

The invention described here relates to a method and a server for a personalization of a smart card coupled with a communication device. In an embodiment, the steps of the method of the invention are determined by the instructions of a computer program incorporated in a server such as the second application server AS2 according to the invention. The program includes program instructions which, when said program is executed in a processor of the server the operation whereof is then controlled by the execution of the program, execute the steps of the method according to the invention.

As a consequence, the invention applies also to a computer program, in particular a computer program on or in an information medium readable by a data processing device, adapted to implement the invention. That program may use any programming language and be in the form of source code, object code or an intermediate code between source code and object code, such as a partially compiled form, or in any other desirable form for implementing the method according to the invention.

The information medium may be any entity or device capable of storing the program. For example, the medium may include storage means or a recording medium on which the computer program according to the invention is recorded, such as a ROM, for example a CD ROM or a microelectronic circuit ROM, or a USB key, or magnetic recording means, for example a diskette (floppy disk) or a hard disk.

The invention claimed is:

1. A method for personalizing a smart card coupled with a communication device of a user being a subscriber of a first telecommunication network and wishing to become a subscriber of a second telecommunication network, a first authentication key being stored in the smart card and in an first application server included in the first telecommunication network, the method comprising the following steps in the smart card:
    establishing a secure session with a second application server included in the second telecommunication network via the first telecommunication network;
    negotiating with the first application server and the second application server in order that the smart card and the second application server agree on an second authentication key, by exchanging messages referring to shared values and shared functions by means of a secure multiparty computation protocol involving the smart card, the first application server and the second application server, and computing the second authentication key depending on at least a shared value and a shared function; and
    replacing the first authentication key by the second authentication key.

2. A method according to claim 1, wherein the smart card replaces the first authentication key by the second authentication key after that the second application server has authenticated the smart card by means of a challenge-response authentication using the second authentication key.

3. A method according to claim 2, wherein the second authentication key depends on the first authentication key.

4. A method according to claim 1, wherein the step of negotiating with the first application server and the second application server comprises the following steps:
    negotiating with the second application server to agree on a random secret,
    negotiating with the first application server to agree on a first function,
    negotiating with the second application server to agree on a second function,
    after the first application server having sent a message to the second application server, the message comprising the value of the result of the first function applied to the first authentication key, computing the second authentication key depending on the value of the result of the second function applied to the random secret and to the value of the result of the first function applied to the first authentication key.

5. A method according to claim 1, wherein the step of negotiating with the first application server and the second application server comprises the following steps:
    negotiating with the second application server to agree on a random secret,
    after the first application server having sent a message to the second application server, the message comprising the value of the result of a first function applied to the first authentication key, computing the second authentication key depending on the value of the result of a second function applied to the random secret and to the value of the result of the first function applied to the first authentication key;
    wherein the first function is part of a public method beforehand known from the smart card and the first application server, and the second function is part of a public method beforehand known from the smart card and the second application server.

6. A method according to claim 4, wherein the first function is a cryptographic hash function which output space is the same as the space of the first authentication key.

7. A method according to claim 4, wherein the second function is a combination mixing function which takes one input from the space of the first authentication key and another input from the space of the random secret.

8. A method according to claim 1 wherein the smart card interrogates the second application server in order to validate the second authentication key, the second application server authenticating the smart card by means of the second authentication key.

9. A method according to claim 1, wherein the smart card receives a message comprising a personalization command and an admin code sent from a manufacturer server triggered by the second application server, and interprets the personalization command to delete the first authentication key and replace it by the second authentication key if the admin code is valid.

10. A method according to claim 9, wherein an application in the smart card checks if the admin code received in said message is compatible with an admin code initially stored in the smart card in order to determine if the received admin code is valid.

11. A method according to claim 1, wherein the messages exchanged during the step of negotiating are short messages.

12. A method according to claim 1, wherein the messages exchanged during the step of negotiating contain data packets and are sent through a service node and a gateway node of the first telecommunication network.

13. A smart card coupled with a communication device of a user being a subscriber of a first telecommunication network and wishing to become a subscriber of a second telecommunication network, a first authentication key being stored in the smart card and in a first application server included in the first telecommunication network, the smart card comprising:
   means for establishing a secure session with a second application server included in the second telecommunication network via the first telecommunication network,
   means for negotiating with the first application server and the second application server in order that the smart card and the second application server agree on an second authentication key, by exchanging messages referring to shared values and shared functions by means of a secure multiparty computation protocol involving the smart card, the first application server and the second application server, and computing the second authentication key depending on at least a shared value and a shared function,
   means for replacing the first authentication key by the second authentication key.

14. An application server for personalizing a smart card coupled with a communication device of a user being a subscriber of a first telecommunication network and wishing to become a subscriber of a second telecommunication network, a first authentication key being stored in the smart card and in another application server included in the first telecommunication network, the application server being included in the second telecommunication network and comprising:
   means for establishing a secure session with the smart card via the first telecommunication network,
   means for negotiating with the smart card and said another application server in order that the smart card and the application server agree on an second authentication key, by exchanging messages referring to shared values and shared functions by means of a secure multiparty computation protocol involving the smart card, said another application server and the application server, and computing the second authentication key depending on at least a shared value and a shared function.

15. A computer program product embodied on a non-transitory computer readable medium capable of being executed in an application server for personalizing a smart card coupled with a communication device of a user being a subscriber of a first telecommunication network and wishing to become a subscriber of a second telecommunication network, a first authentication key being stored in the smart card and in another application server included in the first telecommunication network, the application server being included in the second telecommunication network, said computer program product comprising instructions which, when said program is executed in said application server, execute the following steps:
   establishing a secure session with the smart card via said the first telecommunication network,
   negotiating with the smart card and said another application server in order that the smart card and the application server agree on an second authentication key, by exchanging messages referring to shared values and shared functions by means of a secure multiparty computation protocol involving the smart card, said another application server and the application server, and computing the second authentication key depending on at least a shared value and a shared function.

16. A method according to claim 5, wherein the first function is a cryptographic hash function which output space is the same as the space of the first authentication key.

17. A method according to claim 5, wherein the second function is a combination mixing function which takes one input from the space of the first authentication key and another input from the space of the random secret.

\* \* \* \* \*